United States Patent [19]

Powers et al.

[11] Patent Number: 4,685,984

[45] Date of Patent: Aug. 11, 1987

[54] IMAGE TRANSFER METHOD

[75] Inventors: Carol C. Powers, Madison; Donald W. Lare, Greenville, both of Ohio

[73] Assignee: Avery International Corporation, Pasadena, Calif.

[21] Appl. No.: 893,444

[22] Filed: Aug. 6, 1986

Related U.S. Application Data

[63] Continuation of Ser. No. 763,731, Aug. 9, 1985, abandoned, which is a continuation-in-part of Ser. No. 641,116, Aug. 15, 1984, abandoned.

[51] Int. Cl.[4] ........................ B44C 1/16; B44C 31/00; B32B 31/00

[52] U.S. Cl. .................................... 156/155; 156/235; 156/240; 156/241

[58] Field of Search ............... 156/155, 230, 234, 235, 156/240, 241, 249, 289, 344; 428/40, 42, 202, 200, 914

[56] References Cited

U.S. PATENT DOCUMENTS

| | | | |
|---|---|---|---|
| 3,344,012 | 9/1967 | Strom | 156/240 |
| 3,607,525 | 9/1971 | Strom | 156/240 |
| 3,607,526 | 9/1971 | Blegen | 156/230 |
| 3,985,602 | 10/1976 | Stuart | 156/249 |
| 4,021,591 | 5/1977 | DeVries et al. | 156/230 |
| 4,315,790 | 2/1982 | Rattee et al. | 156/230 |
| 4,392,901 | 7/1983 | Pernicano et al. | 156/155 |

*Primary Examiner*—Donald E. Czaja
*Assistant Examiner*—Louis Falasco
*Attorney, Agent, or Firm*—Pearne, Gordon, McCoy & Granger

[57] ABSTRACT

In a process for transferring indicia from paper to a fabric backing member such as a T-shirt, of the type wherein an indicia carrier layer of tacky contact adhesive is bonded to the backing member by a thermoplastic elastomer layer, the combination of webs involved in the transfer process is supported through the various steps, including the water wash and at least the initiation of fusing, by a temporary support layer of heat-resistant water-impervious polymer having a non-silicone high release coating, and heat and pressure are applied through such layer to firmly fuse the thermoplastic elastomer layer along with the carrier layer and the indicia to the backing member prior to stripping of the temporary support layer. The firm fusing and the release action established by the non-silicone high release coating prevent distortion or destruction of any portion of the indicia during the stripping step.

2 Claims, 8 Drawing Figures

IMAGE TRANSFER METHOD

This is a continutation of application Ser. No. 763,731, filed on Aug. 9, 1985, which is a continuation-in-part of application Ser. No. 641,116, filed Aug. 15, 1984, now abandoned.

This invention relates to image transfer methods employing a layer of clear tacky contact adhesive as an indicia carrier to absorb indicia from a printed, decorated, or illustrated page, document, or other paper sheet for transfer to fabric, the paper sheet being soaked or washed away with water following absorption of the indicia and prior to transfer of the indicia to the fabric.

BACKGROUND OF THE INVENTION

Image transfer methods of the type just referred to have long been known, one application being the transfer of images to T-shirts. However, until the present, no known methods of such type have been sufficiently reliable in use and sufficiently easy to use to be widely accepted and practiced in commercial T-shirt shops. Instead, such shops generally rely on the use of decorative decals or "transfers" which are selected by customers and are then permanently fused and affixed to the T-shirts through the use of a heat transfer press which is part of the normal equipment of a T-shirt store.

Prior tacky contact adhesive carrier type image transfer methods have included methods in which the indicia carrier is covered by a thermoplastic elastomer layer which is intended to be fused to the fabric to anchor the indicia carrier to the fabric and to protect the transferred indicia against abrasion, laundering, and the like, as for example in the method shown in Stuart U.S. Pat. No. 3,985,602. Such fusing of the thermoplastic elastomer anchoring layer requires application of heat while at the same time dimensional stability and integrity of the indicia carrier are required to be maintained. For the latter purpose, temporary support layers have been provided over the thermoplastic elastomer layer. Such temporary support layers are maintained as part of the web construction through several steps of the transfer process, and are intended to be removed only following initial application of heat and partial fusing of the thermoplastic elastomer anchoring layer to the fabric. Additional heat is then provided to complete fusing. However, initial application of heat through the temporary support web to accomplish partial fusing of the thermoplastic elastomer has not been generally satisfactory because of damage to the temporary support layer and interference of such procedure with proper release of the temporary support layer. Such interference causes partial lifting and distortion of the indicia carrier layer when stripping away of the temporary support layer is attempted. Accordingly, in actual practice of such method, reliance has been placed on preheating of the fabric alone prior to application of the indicia carrying layers, followed by application of the indicia carrying layers against the warm fabric, whose residual heat is counted on to partially fuse the thermoplastic elastomer prior to stripping of the temporary support layer. While this procedure has been preferable to applying heat through the temporary support layer, the partial fusing establishes a bond that is so lacking in uniform firmness that proper release of the temporary support without lifting and distortion of the indicia carrier member is still a chancey matter, so much so that marketing of this procedure has been generally limited to home use (heating being done with an iron) where time is not an important factor and where frequent failures and unreliable performance are tolerated to some degree, as distinguished from commercial use in T-shirt shops, where the operator must be able to quickly and reliably accomplish transfer.

Other image transfer methods have been provided, but none have been sufficiently reliable in use and sufficiently easy to use to be widely accepted and practiced in commercial T-shirt shops. Examples of prior methods and devices are found in U.S. Pat. Nos. 3,344,012; 3,607,525; and 3,607,526, which relate in part to image transfer to solid surfaces rather than to fabrics.

BRIEF DESCRIPTION OF THE INVENTION

The present invention provides a reliable process for absorbing indicia from a paper, page or document and transferring the indicia to T-shirts and other fabrics, a process that may be easily completed in a commercial T-shirt shop by use of a heat transfer press commonly available in such shops for transfer of decals.

The invention improves on prior methods by using a temporary support layer of plastic that is both water-impervious and heat-resistant, and that has a non-silicone high release coating which positively differentiates from the low release of a protective liner and which, together with the temporary support layer, establishes a potential for uniformity of high release action even following heating of the construction such that there are no localized areas of abnormally high release, maintaining that temporary support layer as part of the indicia including sandwich of layers during soaking or washing away of the paper from which the indicia are absorbed, and, during the application of the indicia carrier to the fabric and the initiation of the fusing of the thermoplastic elastomer layer, applying heat and pressure through the temporary support layer to the thermoplastic elastomer layer and the fabric to thereby initially fuse the thermoplastic elastomer layer along with the carrier layer and indicia to the fabric by application of both heat and pressure simultaneously to both the thermoplastic elastomer layer and the fabric to establish a firm and uniform initial bond between the fabric and the indicia-including sandwich of layers before the stripping step, and then stripping the temporary support layer with its non-silicone release coating, whose release action remains uniform with no localized areas of relatively high release, from the thermoplastic elastomer layer which is now firmly and uniformly bonded to the fabric. With the firm and uniform bond on the one hand, and on the other hand with a uniform release action with no localized areas of abnormally high release, the temporary support layer may be confidently removed without risk of lifting or distorting the indicia-including sandwich of layers.

DETAILED DESCRIPTION OF THE DRAWINGS

Figure 1:
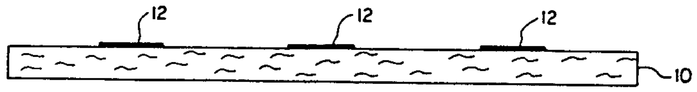
FIGS. 1 through 8 are diagrammatic illustrations of successive stages in the practice of the image transfer process, showing in schematic cross section the various elements being processed. Dimensions are not necessarily to scale and, in particular, thicknesses are greatly exaggerated.

FIG. 1 shows indicia 10 such as text or illustrative or decorative matter which has been printed or otherwise attached to paper 12, and which is to be transferred to a fabric backing member.

Figure 2:
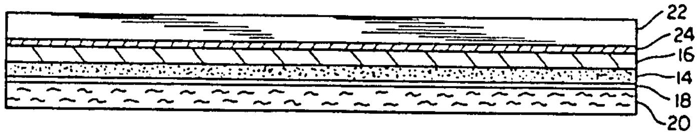
Figure 4:
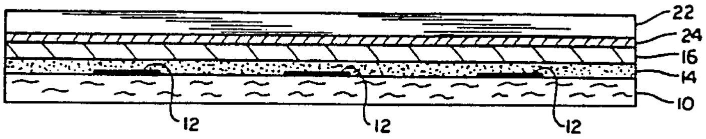

FIG. 2 illustrates initial steps in the practice of the invention. According to known practice, an indicia carrier layer 14 of tacky contact adhesive is combined between a thermoplastic elastomer layer 16 and a protective release liner 20 which may have a conventional silicone low level release coat 18. Also according to known practice in methods employing such an indicia carrier layer and which involve washing away of the paper which originally carries the indicia, a temporary support layer is combined on the side of the thermoplastic layer 16 that is remote from the indicia carrier layer 14, and such temporary support layer is maintained in its supporting relationship through at least the washing step. However, according to the invention, a polymeric temporary support layer 22 is provided that is both heat-resistant and water-impervious, and that is provided with a non-silicone high level release coat 24. This combining step may be either before, during or after the previously described combining step. The temporary support layer 22 of heat-resistant, water-impervious polymer will subsequently (at the stage illustrated in FIG. 4) temporarily form part of an indicia-including sandwich of layers along with the thermoplastic elastomer layer 16 and indicia carrier layer 14, and initially also the paper 10. The non-silicone release coating 24 positively establishes a differentiation of its release action relative to the release action of the protective release liner 20 (and specifically the release action of the low level silicone release coat in the illustrated process) such that stripping of the protective release liner does not affect the integrity of stabilizing support to be afforded by the temporary support layer to the incidia-including sandwich of layers. Moreover, the non-silicone release coating 24, together with the temporary support layer, also establishes a potential for uniformity of high release action even following heating of the construction such that there will be no areas of abnormally high release when the temporary support layer is stripped from the remainder of the indicia-including sandwich of layers.

The temporary support layer 22 of heat-resistant, water-impervious polymer is preferably a polyester such as ICI's "Melinex," DuPont's "Mylar" or Celanese's "Celenar." Films of these materials are capable of withstanding temperatures approaching 400° F. or more, and are capable of sealing laminates of which they form the outer layer against the ingress of water over extended periods, and easily over periods of several hours or overnight. Representative formulas for the non-silicone release coat 24 are as follows:

Formula A 18 parts polyvinyl octodecyl urethane ("Escoat P-20" from East Shore Chemical Company, Inc., Muskegon, Mich.)
10 parts isopropyl alcohol
42 parts toluene about 2.5% solids Formula B 15 parts chrome complex of stearic acid (DuPont's "Quillon C")
123 parts isopropyl alcohol
42 parts toluene about 3% solids Formula C 3 parts copolymer of stearyl methacrylate, acrylonitride and n-vinyl-2-pyrrolidone
97 parts toluene.

Formula A is presently preferred. These coatings may be applied by gravure, wire-wound bar, air knife, or the like, and dried.

The combining steps described so far will generally be performed by a base materials web manufacturer having the resources to economically perform them. The remaining steps are illustrated in FIGS. 3–7 and are performed by an operator at a T-shirt store using a heated press which is part of the normal equipment of such a store, following commercial distribution of the combined layers seen in FIG. 2 and their storage until the time the process is ready to be completed with reference to specific indicia 12 on a specific paper sheet 10.

Figure 3:
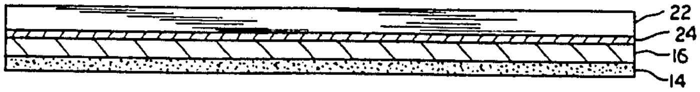
Figure 5:
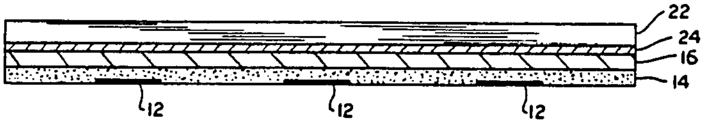

As seen in FIG. 3, the protective release liner 20 (together with its silicone low level release coat 18 in the illustrated process) is first stripped, leaving the indicia carrier layer 14 momentarily exposed. This step does not affect the stabilizing support to be afforded by the temporary support layer 22 to the indicia-including sandwich of layers due to the positive differentiation between the low level release at 18 and the high level potential release at 24. The combined layers remaining are placed against the indicia-bearing face of the paper 10 with the carrier layer 14 against the paper. The indicia 12 and the paper 10 adhere to the carrier layer 14 to produce the indicia-including sandwich of layers shown in FIG. 4. This sandwich of layers is next washed in water, preferably by immersion in a water bath, until the paper 10 is weakened and disintegrated until it is fully removed, leaving the indicia 12 supported by the carrier layer 14 as seen in FIG. 5. During the washing and removing, the construction is subject to the stresses and strains of handling, which may include lightly rubbing off any final remnants of the paper 10 to the extent necessary to complete removal. Nevertheless, the structure remains stabilized throughout the washing and removing, even when the construction is allowed to soak in water for longer than required for thorough removal, for example, when the construction is left soaking overnight. The potential uniform high release action of the non-silicone high level release coat is unaffected by the washing and removing.

Figure 6:
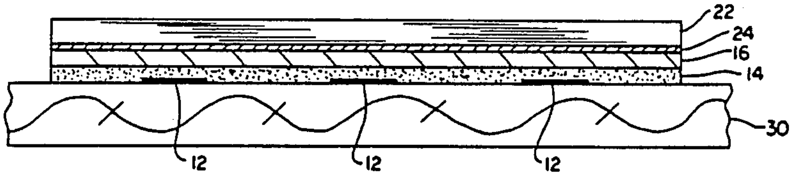
Figure 7:
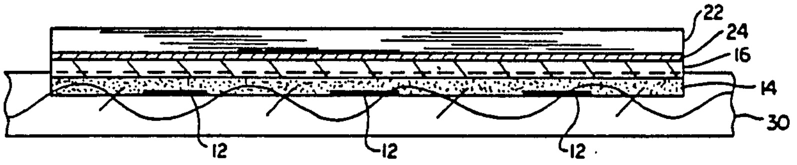

As seen in FIG. 6, the remaining layers of the indicia-including sandwich of layers are next placed on the fabric backing members 30, which may be the front or back of a T-shirt, with the surface of the indicia-retaining carrier layer 14 against the backing member 30. Care is taken to position the sandwich of layers so that the indicia 12 are in the desired register on the backing member. With the sandwich of layers supported on the backing member 30 in a press (not shown), a heated press platen is brought down against the top face of the heat-resistant, water-impervious temporary support layer 22 to initially fuse the thermoplastic layer 16, along with the carrier layer 14 and indicia 12, to the backing member 30 by application of both heat and pressure through the temporary support layer 22 and simultaneously to both the thermoplastic elastomer layer 16 and the backing member 30 to establish a firm and uniform initial bond between the backing member and the indicia-including sandwich of layers. The establishment of this initial bond is suggested by the penetration of backing member 30 indicated in FIG. 7. During the placing of the sandwich of layers on the backing member 30 and the initiation of the fusing stop to the condition of initial firm and uniform bond, the heat-resistant temporary support layer 30 continues to stabilize the sandwich of layers, even during the direct application of heat and pressure through the layer 30.

Figure 8:
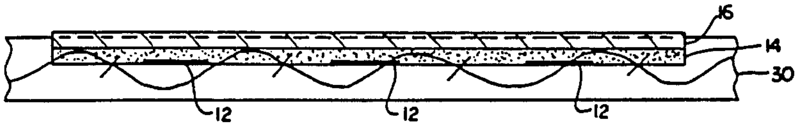

After the initial bonding step, the temporary support layer 22 with its non-silicone high level release coat 24 is stripped from the thermoplastic elastomer layer 16, which is now firmly and uniformly bonded to the backing member 30, to thereby realize the uniform high release action which was established by the release coat 24 and maintained throughout the various processing steps. With such uniform high release on the one hand, such that there are no localized areas of abnormally high release, and with the firm and uniform initial bonding on the other hand, separation of the temporary support layer is effected reliably and without degradation of the indicia-including sandwich of layers or distortion or destruction of any portions of the indicia 12. Following such removal, the same heated platen may be used to apply heat and pressure to the remainder of the indicia-including sandwich of layers and through them the backing member to further strengthen the already established firm and uniform bonding, as suggested by the further penetration of backing member 30 indicated in FIG. 8. Preferably, a protective cover sheet comprising a Teflon-coated fabric sheet of the kind used by T-shirt shops as a pressing sheet (not shown) and having a matte surface is placed over the thermoplastic elastomer layer 16 during this further application of heat and pressure to both protect layer 16 and impart a matte finish thereto.

Typically, a T-shirt operator preheats the T-shirt or other garment in the transfer press for three or four seconds to get the wrinkles out at a press setting of say 350° F.±25° F. The image-carrying layers are applied on the garment and the press is closed for about three seconds at the same press setting. The press is then opened to strip the temporary support layer 22 with its non-silicone high level release coat 24, and a protective cover sheet with a matte surface is "substituted" therefor. Then the press is closed again at the same setting for say 20 seconds.

Alternatively, when the image-carrying layers are first applied to the garment, the press is then closed for about 15 seconds at the same setting. When the press is opened and the layer 22 and non-silicone release coat 24 are stripped, the transfer is complete, having in this instance a glossy finish imparted by the stripped layers.

The press temperature required to obtain a good bond varies between about 250° F. and 375° F., depending on the duration of application. Limits on application time and temperature are:

| Temperature | Bonding Time |
|---|---|
| 250° F. | 60 sec. |
| 300° F. | 30 sec |
| 325° F. | 20 sec. |
| 350° F. | 15 sec. |
| 375° F. | 15 sec. |

The times given are minimum total times to obtain a good bond. The time required for initiation of bonding prior to stripping will be say about a fourth to a seventh of the total time, or say about 3 seconds, at 325° F., for example. Additional time at the given temperature does not have a deleterious effect on the material, so that the process will tolerate unskilled or careless operators who may leave the press closed too long. However, great overexposure to heat, say in excess of two minutes at 325° F., will cause the weave of the fabric to show through to such an extent as to make the image somewhat hazy. At 400° F., some of the colors in indicia which constitute illustrations or other images begin to change.

Release levels in the practice of the invention may average approximately 12 grams for the silicone low level release coat 18 and 38 grams for the non-silicone high level release coat 24, as measured by test PSTC-4 of the Pressure Sensitive Tape Council. This represents a differential of approximately 26 grams between the low and high releases. Average release differential in prior art processes such as those of the type shown in U.S. Pat. No. 3,985,602 have tested out to essentially the same value, or even slightly higher (30 grams). Nevertheless, despite the essential equivalence of the average release differentials between high and low level release coats as measured by standard test procedures, and the importance often given to this differential as an indicator of release performance to be expected, in the present invention the final release or stripping of the temporary support layer is uniformly effective and reliable where the prior art was not. This tends to confirm that the effectiveness and reliability of the final stripping action does not relate directly to the release level differential between the high level and low level release coats, but rather to the differential between the value of the high level release established by coat 24 and the value of the still higher level of "release" (i.e., strength) of the bond established at the initiation of fusing, and particularly to uniformity of the high level release even after initiation of the fusing step such that there are no areas of abnormally high release.

The process conditions given above generally apply when the thermoplastic elastomer layer is urethane. This layer should be formulated to yield a film with at least 300% elongation at break, since substantial stretch is required when bonding to knitted fabrics. Many other materials should perform satisfactorily if formulated to meet this criteria, such as polypropylene, plasticized polyvinyl chloride, vinyl nitrile rubber, rubber hydrochloride, kratons (rubber block copolymers), acrylics, polyvinyl acetate, vinyl chloride-vinyl acetate copolymers, chlorinated rubbers, acrylonitrile-methyl acrylate copolymers, and ethylene-vinyl acetate copolymers.

The elements as described above that remain following the washing step, including the temporary support layer 22, the non-silicone release coat 24, the thermoplastic elastomer layer 16, and the indicia carrier layer 14, may all be transparent, which represents an advantage over prior art systems containing a temporary support layer that is opaque or only semi-transparent. In such a prior art system, the image to be transferred cannot be "tried," for example against T-shirts of different colors, in order to see and judge the effect to be realized by the transfer prior to actually affixing the transfer. However, such "trying" is easily done with the present process.

While the applicability of the present invention to use by commercial T-shirt shops has been emphasized in this description, it will be understood that the invention is also applicable to the imprinted sportswear industry in general (including decoration of sporting goods and athletic uniforms), to the rock concert concession market, the advertising specialty market, and the home craft market.

It should be understood that references herein to washing in water encompass other equivalent washing steps, with particular although not necessarily exclusive reference to aqueous solutions in which water is the major component but surfactants or other agents are present.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. In a process for the transfer of indicia from a paper sheet to a backing member of fabric or the like which includes the steps of combining an indicia carrier layer of tacky contact adhesive between a thermoplastic elastomer layer and a protective release liner, the latter being for protection of the tacky contact adhesive during distribution and storage, providing either before, during or after said foregoing step a release-coated temporary support layer combined on the side of said thermoplastic layer that is remote to said indicia-carrying layer, stripping said protective release liner after storage or transport and placing the remaining combined layers against the indicia-bearing face of said paper sheet with the carrier layer being against the paper sheet whereby the indicia and the paper sheet adhere to the carrier layer to produce an indicia-including sandwich of layers, washing said indicia-including sandwich of layers in water to soften the paper and removing the paper and exposing the carrier layer with the indicia retained therein, placing the remaining layers of the indicia-including sandwich of layers on the backing member with the surface of the indicia-retaining carrier layer against the backing member, fusing said thermoplastic elastomer layer to the backing member along with the carrier layer and the indicia, and stripping said temporary support layer following at least the initiation of said fusing step, the improvement which comprises the steps of including, in said step of providing a temporary support layer combined at the side of said thermoplastic elastomer layer that is remote to said indicia carrier layer, the provision of a temporary support layer of heat resistant water-impervious polymer having a non-silicone high release coating, whereby said temporary support layer of heat-resistant water-impervious polymer subsequently temporarily forms part of said indicia-including sandwich of layers, said non-silicone release coating not only establishing a uniformly positive differentiation of its potential high release action relative to the release action of said protective release liner such that said step of stripping the latter does not affect the integrity of stabilizing support to be afforded by said temporary support layer to said indicia-including sandwich of layers, but also said non-silicone release coating establishing, together with said temporary support layer of heat-resistant water-impervious polymer, uniformity of its said potential high release action such that there will be no localized areas of abnormally high release when said temporary support layer is stripped fom the remainder of said indicia-including sandwich of layers following at least the initiation of said fusing step, maintaining said temporary support layer of heat-resistant water-impervious plastic as part of said indicia-including sandwich of layers in overlying protective relation to said non-silicone release coating and the layers adjacent thereto during said step of washing and removing whereby not only is said sandwich of layers stabilized during said step of washing and removing, but also said potential uniform high release action of said non-silicone release coating, under protection of said water-impervious plastic temporary support layer, is unaffected by said washing and removing, further maintaining said temporary support layer of heat-resistant water-impervious plastic as part of said indicia-including sandwich of layers during said placing step and the initiation of said fusing step to thereby utilize heat-resistant means to stabilize said indicia-including sandwich of layers during said times, including in said fusing step the application of heat and pressure through said temporary support layer of heat-resistant water-impervious plastic to the remainder of said indicia-including sandwich of layers and the backing member, whereby said thermoplastic elastomer layer along with said carrier layer and indicia are at least initially fused to the backing member by application of both heat and pressure through the temporary support layer and simultaneously to both the thermoplastic elastomer layer and the backing member to establish a firm and uniform bond between the backing member and said indicia-including sandwich of layers, the fusing step including exposure of said indicia-including sandwich of layers to a temperature of at least about 250° F., and, following said at least initial fusing, stripping said temporary support layer with its non-silicone release coating from said thermoplastic elastomer layer which is now firmly and uniformly bonded to the backing member, to thereby realize said potential uniform high release action vis-a-vis said firm and uniform bonding and thereby effect separation of said temporary support layer without degradation of the remainder of said indicia-including sandwich of layers or distortion or destruction of any portion of the indicia.

2. In a process as in claim 1, further including in said fusing step applying more heat and pressure directly to said remainder of said indicia-including sandwich of layers and through them to the backing member following said stripping of said temporary support layer to further strengthen said firm and uniform bonding.

* * * * *